United States Patent
Turullols et al.

(10) Patent No.: US 12,425,974 B2
(45) Date of Patent: Sep. 23, 2025

(54) POWER AND TEMPERATURE DRIVEN BANDWIDTH THROTTLING USING DELAY INSERTION

(71) Applicant: XILINX, INC., San Jose, CA (US)

(72) Inventors: Sebastian Turullols, Los Altos, CA (US); Naga Murali Narasimha Rao Medeme, Hyderabad (IN); Ravinder Sharma, Hyderabad (IN); Jayaram Pvss, Hyderabad (IN); Indlamuri Hemanth Kumar, Guntur (IN); Kaustuvmani Manji, Hyderabad (IN)

(73) Assignee: XILINX, INC., San Jose, CA (US)

( * ) Notice: Subject to any disclaimer, the term of this patent is extended or adjusted under 35 U.S.C. 154(b) by 547 days.

(21) Appl. No.: 17/855,439

(22) Filed: Jun. 30, 2022

(65) Prior Publication Data

US 2024/0007955 A1 Jan. 4, 2024

(51) Int. Cl.
*G06F 1/00* (2006.01)
*G06F 1/3203* (2019.01)
(Continued)

(52) U.S. Cl.
CPC ...... *H04W 52/0274* (2013.01); *G06F 1/3203* (2013.01); *G06F 1/3206* (2013.01);
(Continued)

(58) Field of Classification Search
CPC .......... H04W 52/0274; H04W 52/0251; G06F 1/3203; G06F 1/3206; G06F 1/3212; G06F 1/3287; G06F 1/206; G06F 1/3215; G06F 1/324; G06F 1/3278; G06F 1/329; G06F 3/0613; G06F 2213/0026;
(Continued)

(56) References Cited

U.S. PATENT DOCUMENTS 7,245,707 B1 * 7/2007 Chan ................. H04M 1/72433
709/227
7,426,597 B1 * 9/2008 Tsu ..................... G06F 13/4018
710/29

(Continued)

FOREIGN PATENT DOCUMENTS

KR 101874347 B1 * 7/2018 .......... H04L 49/351

*Primary Examiner* — Xuxing Chen
(74) *Attorney, Agent, or Firm* — Patterson + Sheridan, LLP

(57) ABSTRACT

Methods and systems to manage an environmental condition, such as power consumption and/or temperature, of an integrated circuit (IC) device by controlling a bandwidth of a packet-based communication interface of the IC device (e.g., a PCIe interface). Bandwidth may be controlled by controlling delay between packets or controlling delay of a handshake signal. Delay may be increased when the environmental condition reaches a first threshold. Delay may be reduced when the environmental condition falls to a second threshold. Bandwidth may be regulated with proportional-integral control provided by a firmware controller and/or hardware. Bandwidth may be separately controlled for upstream and downstream paths based on bandwidth utilization of the respective paths. Bandwidth control may utilize codes stored in selectable registers. The IC device may include a field programmable gate array (FPGA) and may be configured as an accelerator card.

17 Claims, 8 Drawing Sheets

(51) Int. Cl.
  *G06F 1/3206* (2019.01)
  *G06F 1/3212* (2019.01)
  *G06F 1/3287* (2019.01)
  *H04W 52/02* (2009.01)

(52) U.S. Cl.
  CPC .......... *G06F 1/3212* (2013.01); *G06F 1/3287* (2013.01); *H04W 52/0251* (2013.01)

(58) Field of Classification Search
  CPC ..... G06F 2213/0024; G06F 2213/0032; G06F 9/505; G06F 13/42; G06F 1/32; G06F 11/3485; H04L 47/10; H04L 41/0896; H04L 47/125; H04L 43/0888; H04L 45/125
  See application file for complete search history.

(56) References Cited

U.S. PATENT DOCUMENTS

| | | | | |
|---|---|---|---|---|
| 2004/0054938 | A1* | 3/2004 | Belady | G06F 1/3203 |
| | | | | 713/300 |
| 2015/0006924 | A1* | 1/2015 | Jain | G06F 3/0625 |
| | | | | 713/320 |
| 2017/0346751 | A1* | 11/2017 | Barnes | H04L 47/27 |
| 2018/0270864 | A1* | 9/2018 | Tortelier | H03M 13/373 |
| 2022/0022223 | A1* | 1/2022 | Yang | H04L 5/0048 |
| 2022/0188021 | A1* | 6/2022 | Park | G06F 3/0688 |

\* cited by examiner

POWER AND TEMPERATURE DRIVEN BANDWIDTH THROTTLING USING DELAY INSERTION

A. TECHNICAL FIELD

Examples of the present disclosure generally relate to managing power consumption and temperature in electronics.

B. BACKGROUND

An integrated circuit (IC) device may be subject to environmental constraints, such as power consumption and/or temperature constraints. A power consumption constraint may be based on available power. A temperature constraint may specify a maximum temperature at which the IC device is expected to perform as designed.

Power consumption and temperature may depend on a workload of the IC device (e.g., number of operations performed in a given period of time). For a given electronic device, power consumption generally increases with increasing workload, and temperature generally increases with increasing power consumption.

For fixed or static workloads, environmental constraints may be accommodated by design (e.g., design/selection of components, power supplies, and cooling features), For dynamically variable workloads, design of the IC device may be based on a worst-case workload scenario to ensure that environmental constraints are not exceeded. This may lead to underutilized resources.

SUMMARY

Disclosed herein are techniques to manage power consumption and/or temperature of an integrated circuit (IC) device.

One example described herein is an integrated circuit device that includes a packet-based communication interface and regulator circuitry that controls a bandwidth of the packet-based communication interface based on an environmental condition of the integrated circuit device.

Another example described herein is an apparatus that includes non-volatile memory circuitry, a sensor to sense an environmental condition, packet-based communication interface circuitry configured to interface between the non-volatile memory circuitry and an external device, and regulator circuitry configured to control a bandwidth of the packet-based communication interface based on the sensed environmental condition.

Another example described herein is a method that includes exchanging packets between an integrated circuit (IC) device and another device over a communication path under control of packet-based communication circuitry of the IC device, sensing an environmental condition of the IC device, and controlling a bandwidth of the communication path based on sensed environmental condition.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
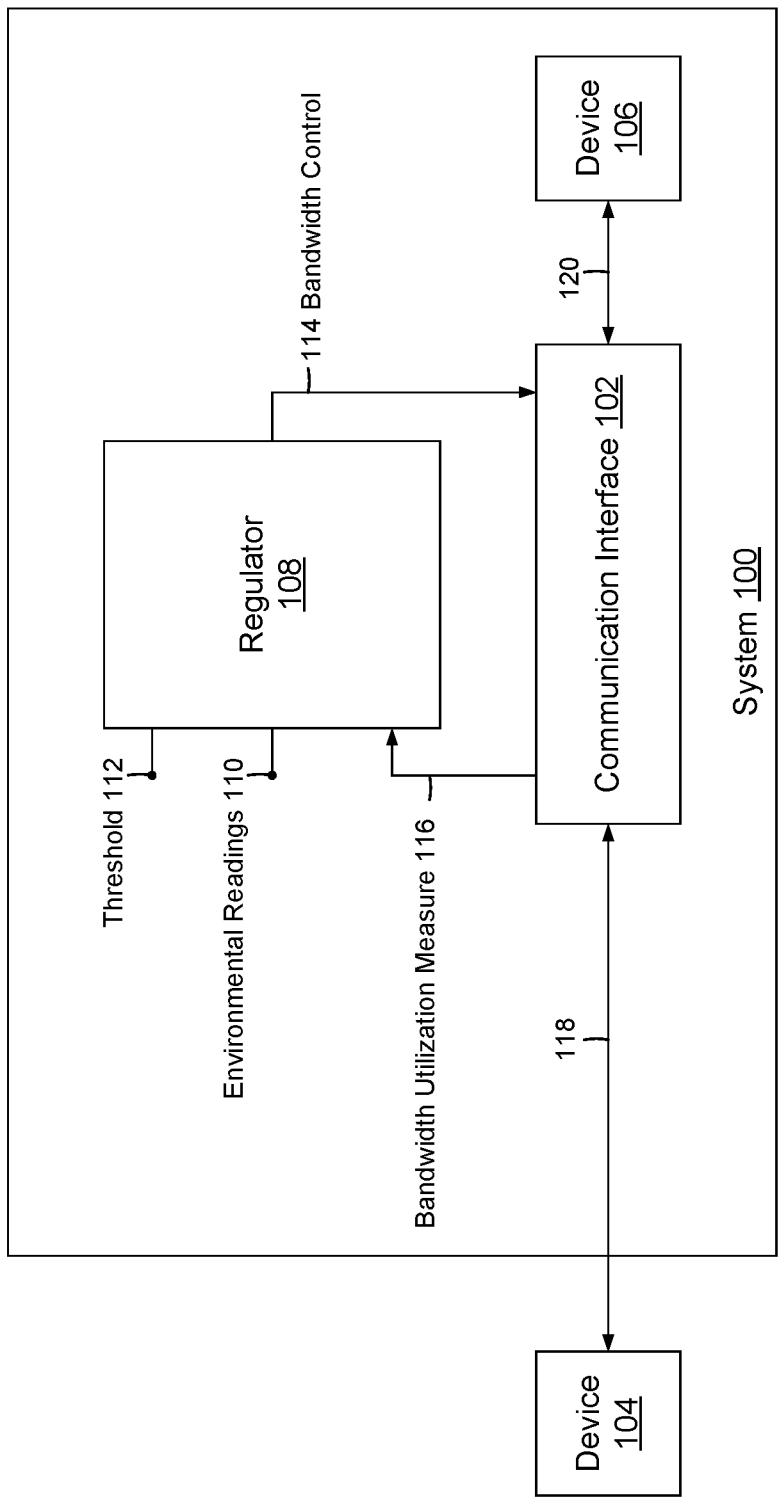
FIG. 1 is a block diagram of a system that includes a regulator to control a bandwidth of a communication interface based on a bandwidth control, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques to manage an environmental condition of an integrated circuit (IC) device, such as temperature and/or power consumption, by reducing or throttling a workload of the IC device when the environmental condition exceeds a threshold.

Workload throttling may be useful in an expansion card, such as an accelerator card, a graphics card, and/or a memory card, in which a workload may vary dynamically over time. As disclosed herein, the workload handed off to an expansion card may be throttled when power consumption and/or temperature exceeds a threshold.

Workload throttling may be useful in a user-configurable IC device, such as a field programmable gate array (FPGA) of an expansion card or other device. User-customizable functionalities may permit an expansion card to be used in a wider set of use scenarios and may permit a user to update the expansion card with new or improved functionalities over time. The customizable functionalities may, however, complicate management of power consumption and temperature. For example, the workload may vary amongst regions of the expansion card, and/or may vary amongst expansion cards.

Even in cards with fixed logic, or mixtures of fixed and customizable logic, designers and users need to respect various thresholds for power consumption and temperatures to avoid damaging the card or causing the card to perform erratically. For example, designers and users may use various models based on worst-case power consumption profiles to ensure that a card will operate within power and temperature thresholds. The worst-case power consumption profile, however, may be based on a highest anticipated peak power demand, which in practice may be relatively short in duration. Accordingly, the models tend to be pessimistic in planning for card usage based on the highest anticipated peak power demand, which can lead to under-utilized resources and/or inferior choices in how to program and operate the cards for actual use conditions, Workload throttling may be useful in the foregoing situations to permit a designer or user to utilize more realistic models and to accommodate surges in power usage and/or temperature by temporarily throttling workload.

Workload throttling may be useful to utilize an IC device more aggressively (e.g., based on average rather than worst-case environmental conditions). For example, a conventional IC device may allocate x Watts of total available power evenly amongst N circuit blocks (i.e., x/N Watts per block), even if the individual blocks are rated for a higher power consumption. With workload throttling, an individual block may be permitted to utilize more than x/N watts, up to a maximum power rating of the block, until total power consumption of the IC device approaches x Watts, or until a temperature of the IC device reaches a temperature threshold.

As another example, a conventional IC device having x Watts of available power may be limited to N blocks by design based on a maximum rated power consumption of x/N Watts per block. With workload throttling, an IC device having x Watts of available power may include more than the N blocks, even though operating all of the blocks at their maximum power consumption would exceed the total available power. In this example, the workload of one of more of the blocks is throttled when the total power consumption approaches x Watts or when the temperature reaches a temperature threshold.

Workload throttling may be useful to provide or enable new and/or improved design choices in field programmable gate arrays (FPGAs), more efficient thermal design (e.g., lower thermal design power), and flexibility to work with different FPGA power/temperature budgets.

Techniques disclosed herein may be useful with peripheral component interconnect express (PCIe) technology, devices, and/or protocols.

FIG. 1 is a block diagram of a system 100, according to an embodiment. System 100 may represent an IC device (e.g., a die, a chip, a chipset, a system-on-a-chip (SoC), and/or a field programmable gate array (FPGA)), a computer, a server, a bank of computers and/or servers, a circuit board or card, and/or combinations thereof. System 100 is not, however, limited to these examples.

System 100 includes communication circuitry, illustrated here as a communications interface 102 that interfaces between a device 106 of system 100 and a device 104 over respective communication paths 118 and 120.

Device 106 may be referred to as internal device, a local agent, a downstream device, or an endpoint device. Device 106 may include, without limitation, a solid-state drive (SSD).

Device 104 may be referred to as an external device, a remote agent, an upstream device, a host, and/or a root complex. Device 104 may include, without limitation, a host computing system.

System 100 further includes regulator circuitry, illustrated here as a regulator 108 that regulates a bandwidth or throughput of communication interface 102 based on an environmental condition of system 100. Regulator 108 may monitor environmental readings 110 with respect to one or more thresholds 112. Regulator 108 may reduce the bandwidth of communication interface 102 when environmental readings 110 exceed a first threshold. Thereafter, regulator 108 may increase the bandwidth of communication interface 102 when environmental readings 110 fall below a second threshold.

Environmental readings 110 may include, without limitation, temperature readings and/or power consumption readings associated with system 100.

In an embodiment, regulator 108 controls the bandwidth of communication interface 102 based further on a bandwidth utilization measure 116 (i.e., current bandwidth). Bandwidth utilization measure 116 may be determined on a periodic basis and compared against a targeted bandwidth for dynamic power scaling. Delay insertion may be tuned based on a difference between the targeted bandwidth and bandwidth utilization measure 116.

Regulator 108 may control the bandwidth with a bandwidth control 114.

Reducing the bandwidth of communication interface 102 may reduce a workload of system 100, which may reduce power consumption and/or temperature of system 100. Controlling the bandwidth of communication interface 102 may thus be useful to manage power consumption and/or temperature of system 100.

In an embodiment, communication interface 102 includes a packet-based communication interface, and regulator 108 controls the bandwidth by controlling delay between packets. An example is provided below with reference to FIG. 2.

Figure 2:
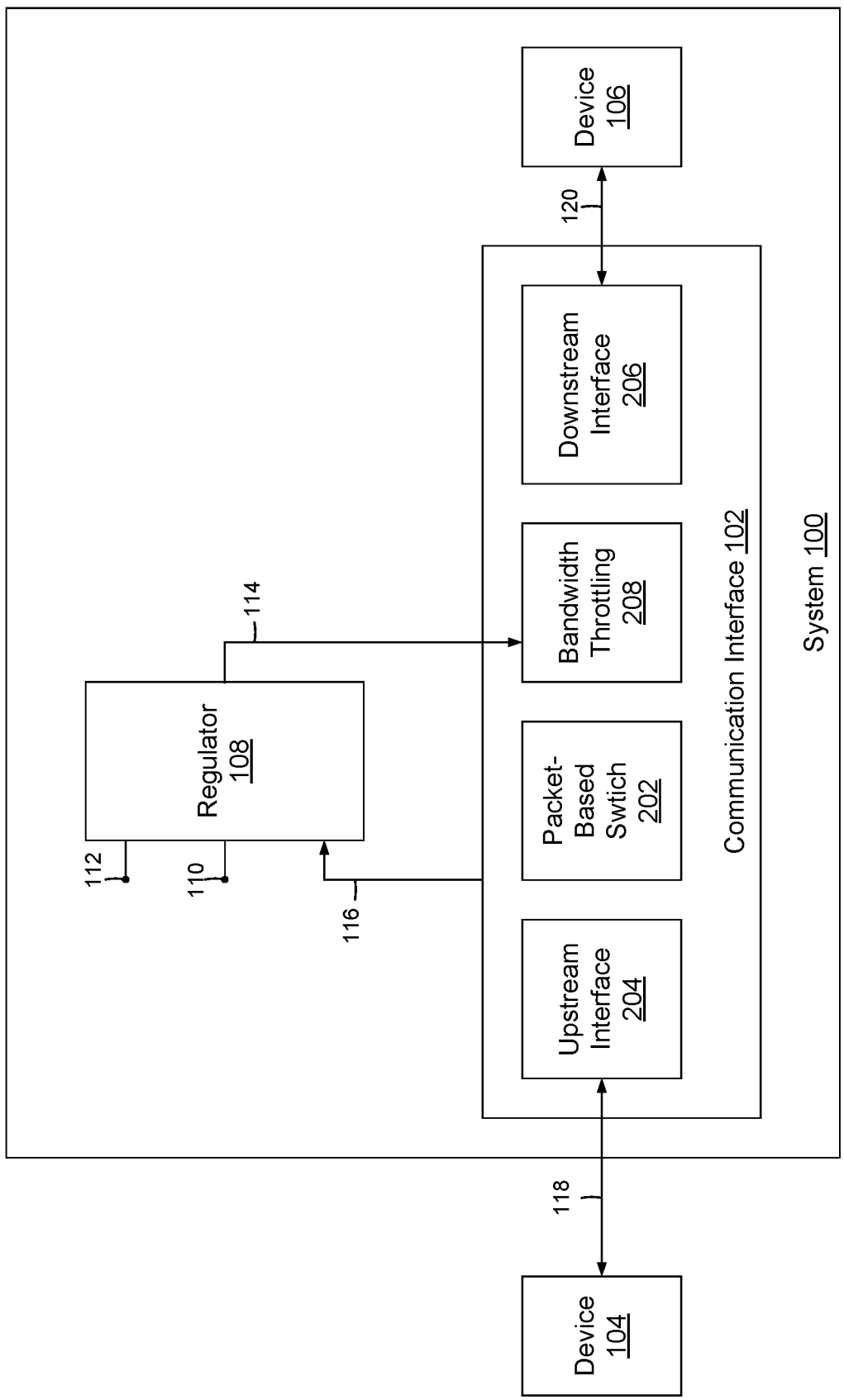
FIG. 2 is a block diagram of the system of claim 1 according to an embodiment in which the communication interface includes a packet-based switch and a bandwidth throttling module.

FIG. 2 is a block diagram of system 100, according to an embodiment in which communication interface 102 includes a packet-based switch 202.

Packet-based switch 202 may operate in accordance with a peripheral component interconnect express (PCIe) standard promulgated by the Peripheral Component Interconnect Special Interest Group (PCI-SIG), based in Beaverton, Oregon. PCIe utilizes a switch that controls several point-to-point serial connections. A PCIe switch includes an upstream port, one or more downstream ports, and switching logic that routes transaction layer packets (TLPs) between the ports.

In FIG. 2, communication interface 102 further includes an upstream interface 204 that interfaces between packet-based switch 202 and device 104. Communication interface 102 further includes a downstream interface 206 that interfaces between packet-based switch 202 and device 106.

Upstream interface 204 and downstream interface 206 may conduct handshake operations with respective devices 104 and 106. A handshake operation utilizes one or more signals for authentication and/or coordination. In this example, regulator 108 may control the bandwidth of communication interface 102 by controlling a delay of one or more handshake signals.

Upstream interface 204 and downstream interface 206 may be configured in accordance with an Advanced eXtensible Interface (AXI) protocol developed by ARM Ltd., of Cambridge, England.

AXI defines a handshake mechanism that utilizes a valid signal and a ready signal. The valid signal is driven by a source entity to inform a destination entity that a payload on a channel is valid and may be read from that clock cycle onwards. The ready signal is driven by the destination entity as notification that the destination entity is prepared to receive data. When the valid and ready signals are active (e.g., high) in the same clock cycle, the data payload is considered "transferred." The source entity may then provide a new data payload by keeping the valid signal high or may terminate the transmission by de-asserting the valid signal. In this example, regulator 108 may control the bandwidth of communication interface 102 by controlling a delay of a ready signal and/or a valid signal used in handshaking.

In FIG. 2, communication interface 102 further includes a bandwidth throttling module 208 that controls the bandwidth of communication interface 102 based on bandwidth control 114. Bandwidth throttling module 208 may intercept traffic through downstream interface 206 and/or upstream interface 204 and add delay at packet boundaries. Per packet delays may be relatively short (e.g., on the order of nanoseconds). Relatively short per packet delays may avoid timeouts.

Regulator 108 and bandwidth throttling module 208 may control bandwidths of upstream and downstream communication paths, such as described below with reference to FIG. 3.

Figure 3:
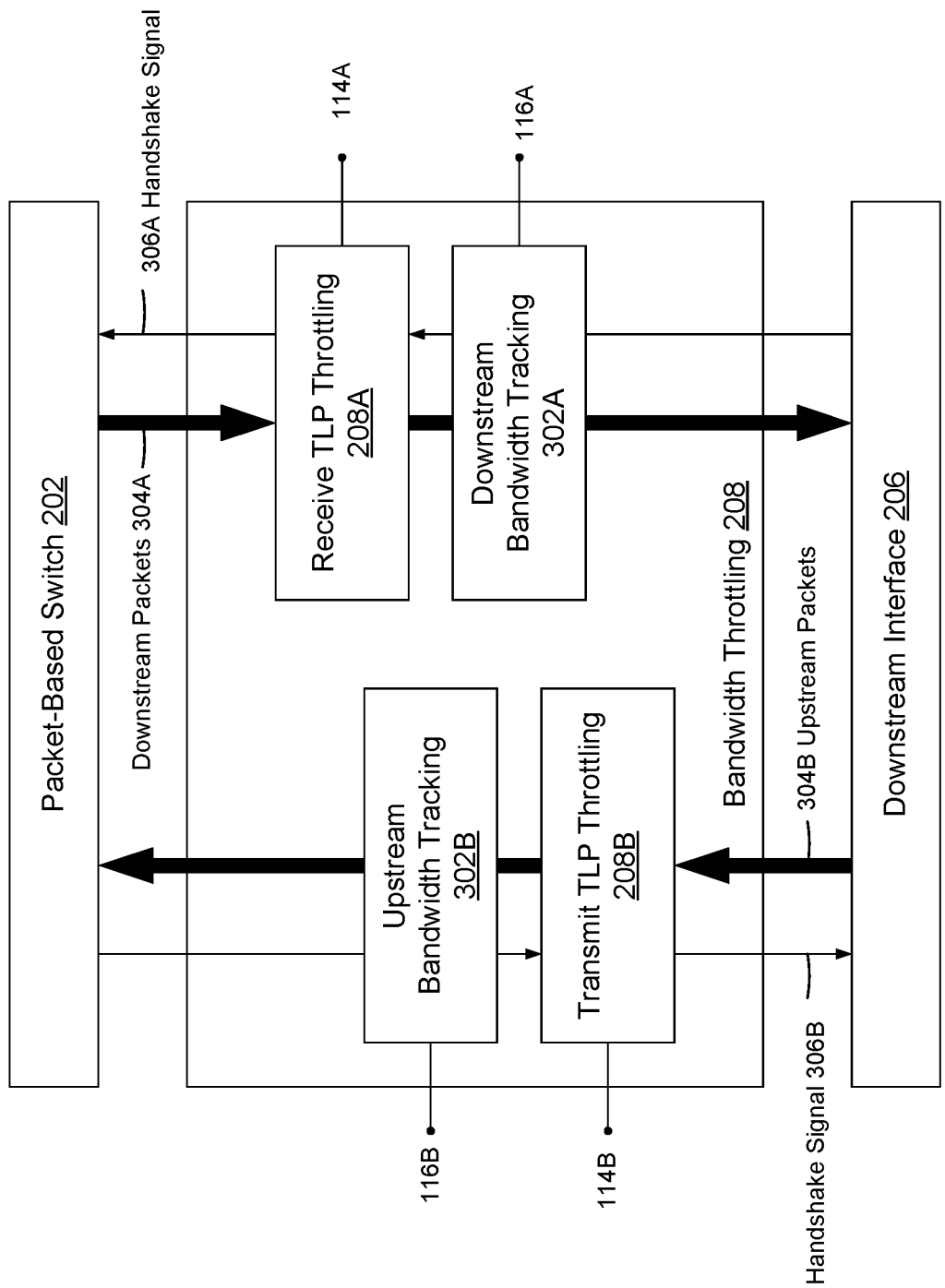
FIG. 3 a block diagram of the bandwidth throttling module, according to an embodiment.

FIG. 3 a block diagram of bandwidth throttling module 208, according to an embodiment.

In the example of FIG. 3, bandwidth throttling module 208 includes a downstream or receive TLP throttling module 208A that controls a downstream bandwidth based on a downstream bandwidth control 114A from regulator 108. Receive TLP throttling module 208A may control the downstream bandwidth by controlling a delay between downstream packets 304A. Receive TLP throttling module 208A may, for example, control a delay of a downstream handshake signal 306A, such as a valid or ready handshake signal.

Bandwidth throttling module 208 further includes an upstream or transmit TL P throttling module 208B that controls an upstream bandwidth based on an upstream bandwidth control 1148 from regulator 108. Transmit TLP throttling module 208B may control the upstream bandwidth by controlling a delay between upstream packets 304B. Transmit TLP throttling module 208B may, for example, control a delay of an upstream handshake signal 306B, such as a valid or ready handshake signal.

Bandwidth throttling module 208 further includes a downstream bandwidth tracking module 302A that provides a downstream bandwidth utilization measure 116A to regulator 108.

Bandwidth throttling module 208 further includes an upstream bandwidth tracking module 3028 that provides an upstream bandwidth utilization measure 116B to regulator 108.

When environmental readings 110 exceed environmental threshold 112, regulator 108 may selectively control receive TLP throttling module 208A and/or transmit TLP throttling module 208B based on downstream and upstream bandwidth utilization measures 116A and 116B. For example, if downstream bandwidth utilization measure 116A indicates that the downstream bandwidth is at or near capacity, and upstream bandwidth utilization measure 116B indicates that the upstream bandwidth is below capacity, regulator 108 may elect to decrease or throttle the downstream bandwidth and leave the upstream bandwidth as-is.

Figure 4:
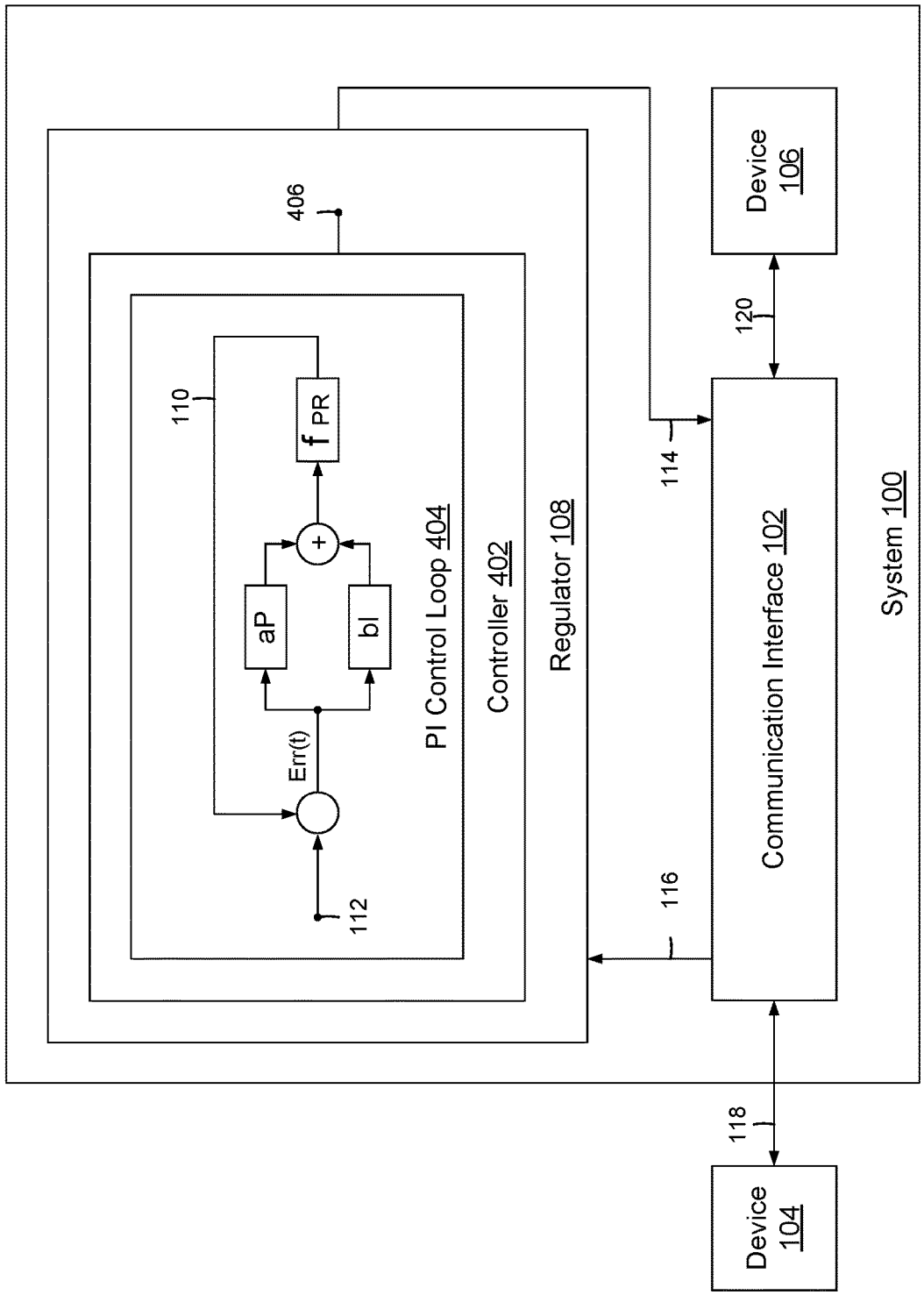
FIG. 4 is a block diagram of the system of FIG. 1 according to an embodiment in which the regulator includes a controller.

FIG. 4 is a block diagram of system 100 according to an embodiment in which regulator 108 includes controller circuitry, illustrated here as a controller 402 that executes computer instructions or code, which may be embedded or stored in firmware.

In the example of FIG. 4, controller 402 compares environmental readings 110 and threshold 112 in a proportional-integral (PI) control loop 404. PI control loop 404 includes coefficients "a" and "b," which may be programmable, such as to accommodate variations in manufacturing processes associated with system 100.

PI control loop 404 may be configured with specified power & temperature threshold (upper limits) of system 100. PI control loop 404 may periodically read environmental readings 110 (e.g., power consumption and/or temperature), and apply PI control in a continuous manner.

In another embodiment, PI control loop 404 is implemented in hardware and/or programmable logic.

Controller 402 may increment or decrement a control 406 based on PI control loop 404. Regulator 108 may output control 406 as bandwidth control 114. Alternatively, regulator 108 or other circuitry may process control 406 to generate bandwidth control 114. An example of the latter is provided below with reference to FIG. 5.

Figure 5:
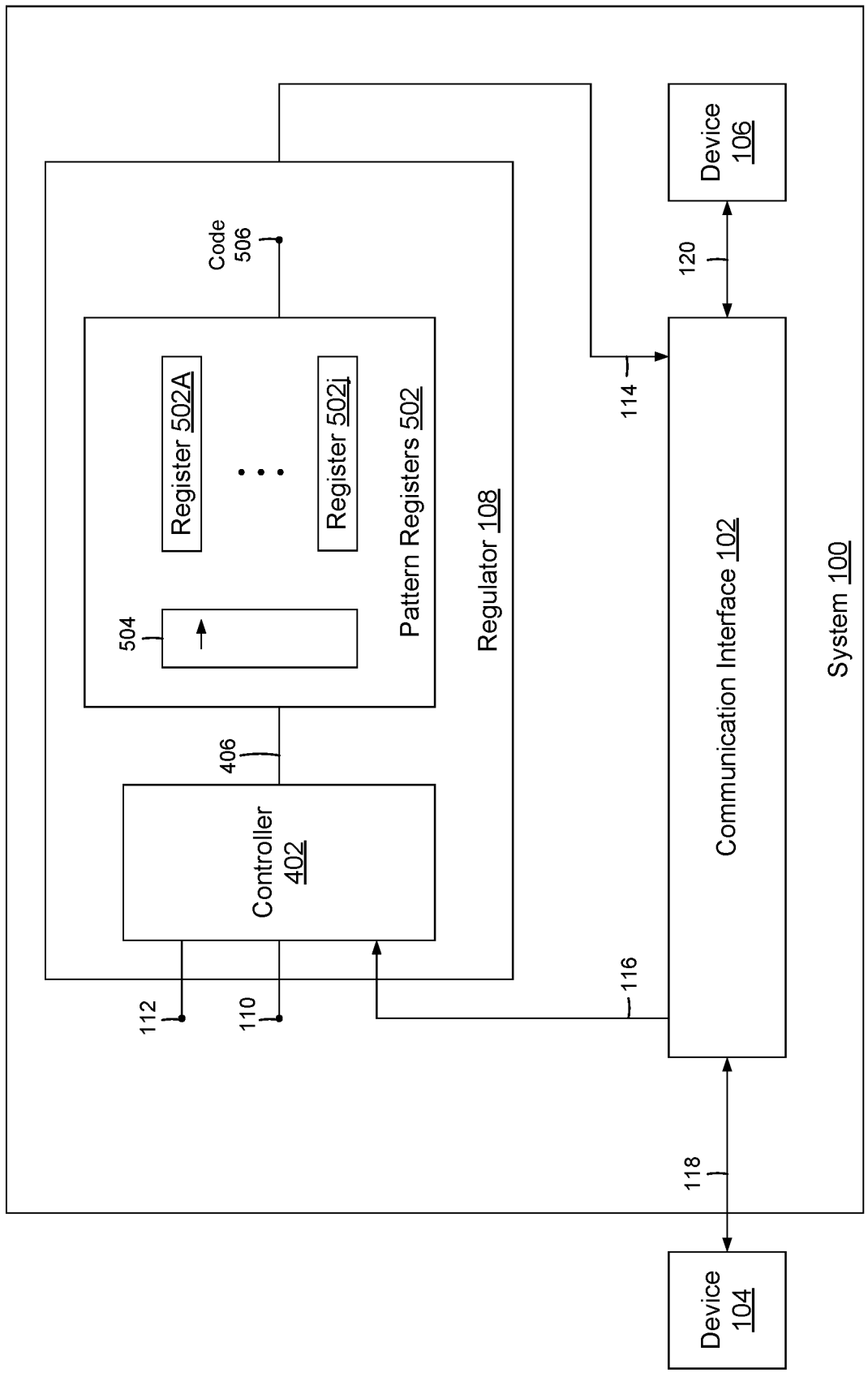
FIG. 5 is a block diagram of the system of FIG. 1 according to an embodiment in which the regulator includes the controller and pattern registers.

FIG. 5 is a block diagram of system 100 according to an embodiment in which regulator 108 includes controller 402 of FIG. 4, and further includes pattern registers 502A-502j.

Each of pattern registers 502A-502j includes a respective pattern of ones and zeros. In an embodiment, there are eight 32-bit pattern registers 502A-502j that collectively store 8×32=256 soft bits. Pattern registers 502A-502j are not, however, limited to this example.

In an embodiment, one of pattern registers 502A-502j is selected based on control 406. Control 406 may, for example, increment or decrement address counter circuitry, illustrated here as an address counter 504. The address is then used to output the contents of a respective one of pattern registers 502A-502j as a code 506. The selectable patterns essentially serve as control knobs for workload or bandwidth throttling.

In an embodiment, contents of pattern registers 502A-502j are programmable through upstream interface 204 or downstream interface 206 in FIG. 2 (e.g., through a slave AXI interface). A default code may be defined to indicate no bandwidth throttling.

Regulator 108 may include or utilize a function that evenly distributes ones and zeros in pattern registers 502A-502j. This may smoothen logic activity and improve a control loop response.

Pattern registers 502A-502j may provide relatively wide granularity.

System 100 may include additional circuitry to manage bandwidth control 114 based on code 506, an example of which is provided below with reference to FIG. 6.

Figure 6:
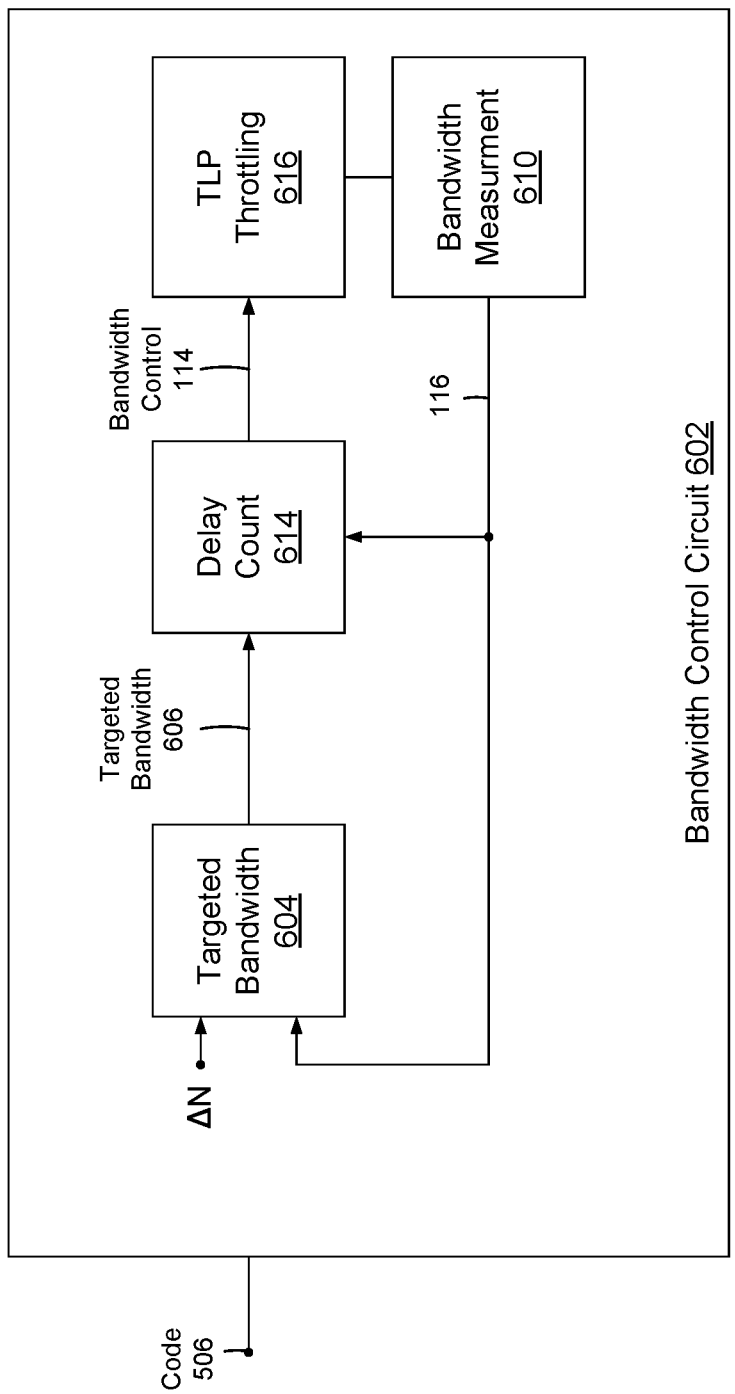
FIG. 6 is a block diagram of a bandwidth control circuit to manage the bandwidth control of FIG. 1.

FIG. 6 is a block diagram of a bandwidth control circuit 602 to manage bandwidth control 114 based on code 506, according to an embodiment.

Bandwidth control circuit 602 includes a targeted bandwidth module 604 that determines a targeted bandwidth 606 based on bandwidth utilization measure 116 and ΔN, where ΔN represents a difference between the number of ones within code 506 and the number of ones within a prior code 506.

Bandwidth control circuit 602 further includes a feedback loop that includes a TLP throttling module 616 that controls the bandwidth of communications interface 102 based on bandwidth control 114. TLP throttling module 616 may represent bandwidth throttling module 208 in FIG. 2, receive TLP throttling module 208A in FIG. 3, or transmit TLP throttling module 208B in FIG. 3.

The feedback loop further includes a bandwidth measurement module 610 that determines bandwidth utilization measure 116.

Bandwidth control circuit 602 further includes a delay count module 614 that determines a delay count based on targeted bandwidth 606 and bandwidth utilization measure 116. In this example, delay count module 614 outputs the delay count as bandwidth control 114.

Bandwidth control circuit 602 may reside within regulator 108, communication interface 102, or a combination thereof.

System 100 may be useful in a peripheral device or expansion card of a computing system, an example of which is provided below with reference to FIG. 7.

An expansion card may perform a general, special, and/or customizable computing function on behalf of a host system. Example expansion cards include, without limitation, accelerator cards, graphics cards, and memory cards. An expansion card may permit a user to implement customized hardware acceleration functions, which can lead to variable workloads on different cards (or regions of individual cards) based on the customized functionality. As described below, a workload handed off to an expansion card is throttled when power consumption and/or temperature exceed a threshold.

Figure 7:
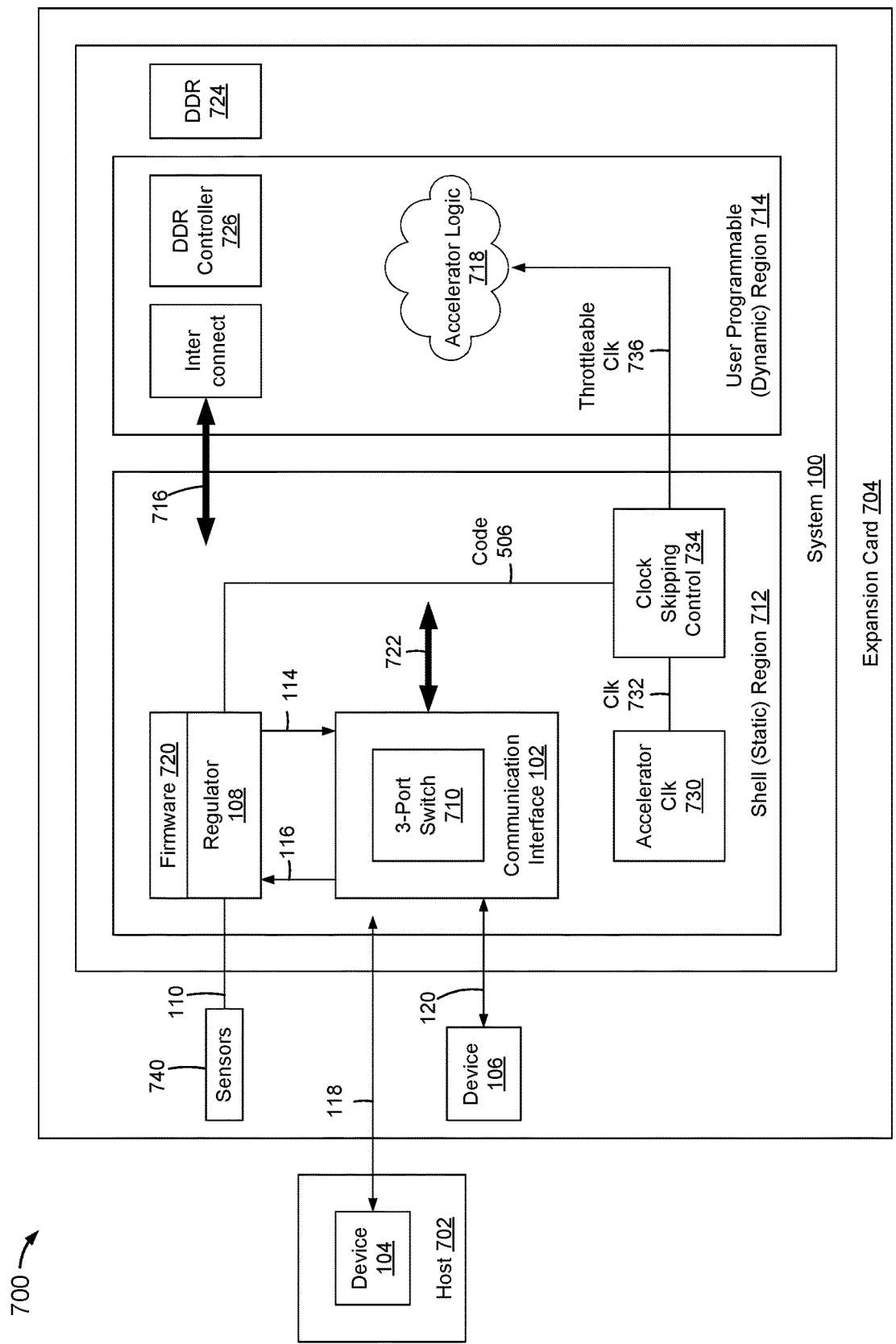
FIG. 7 is a block diagram of a system that includes a host and an expansion card, where the expansion card includes the system of FIG. 1.

FIG. 7 is a block diagram of a system 700 that includes a host 702 and an expansion card 704. Expansion card 704 includes system 100.

Host 702 may include a processor that executes an operating system and an applications program, and expansion card 704 may be configured as an accelerator card. In this example, host 702 may offload work of the application program to expansion card 704.

In FIG. 7, system 100 is illustrated as a field programmable gate array (FPGA) that includes a shell or static region 712 and a user programmable or dynamic region 714. Static region 712 and dynamic region 714 communicate with one another over a static region access infrastructure 716. Dynamic region 714 includes user-configurable accelerator logic 718.

Further in FIG. 7, host 702 includes device 104 and expansion card 704 includes device 106. Device 106 may include non-volatile memory (NVM), such as a SSD. In this example, communication interface 102 includes a 3-port switch 710 that interfaces with device 104 and device 104. 3-port switch 710 may also interface with static region 712 and/or dynamic region 714 over a communication path 722.

Communication interface 102 may establish a link between devices 104 and 106 and may further establish a link with static region 712 and/or dynamic region 714, in accordance with a PCIe protocol. Communication interface 102 may establish one or more links further in accordance with a NVM Express (MVMe) specification promulgated by the MVM Express consortium of Beaverton, OR. MVMe is an open, logical-device interface specification for accessing a computer's non-volatile storage media typically attached via PCIe.

In FIG. 7, regulator 108 controls an upstream and/or downstream bandwidth of communication path 118 and/or communication path 120 based on environmental conditions of expansion card 704, such as described in one or more examples herein. Regulator 108 may utilize instructions/code and environmental thresholds stored in firmware 720.

Expansion card 704 may include one or more environmental sensors 740 to provide environmental readings 110. Expansion card 704 may further include an analog-to-digital converter (ADC) to convert an analog output of an environmental sensor 740 to a digital value or code.

Environmental sensors 740 may include temperature sensors. Alternatively, or additionally, an IC die junction temperature may be provided through user-accessible register reads.

Environmental sensors 740 may include voltage and/or current sensors. The voltage and/or current sensors may sense voltage and/or current on power supply rails of communication path 118 and/or communication path 120. Power consumption may be derived from voltage and/or current readings.

Expansion card 704 may further include random access memory, illustrated here as double data rate (DDR) memory 724 (e.g., DDR Synchronous Dynamic Random Access Memory (DDR SDRAM)). In this example, dynamic region 714 includes a corresponding memory controller, illustrated here as DDR controller 726.

Expansion card 704 may plug into a slot of a chassis of host 702.

In an embodiment, static region 712 further includes an accelerator clock circuit 730 that generates a clock 732, and a clock skipping control 734 that selectively throttles (e.g., inserts delay into) clock 732 based on code 506, to provide a throttleable clock 736 to accelerator logic 718. This may be useful to reduce power consumption of accelerator logic 718 when environmental readings 110 (e.g., power consumption and/or temperature) exceed a threshold 112.

Figure 8:
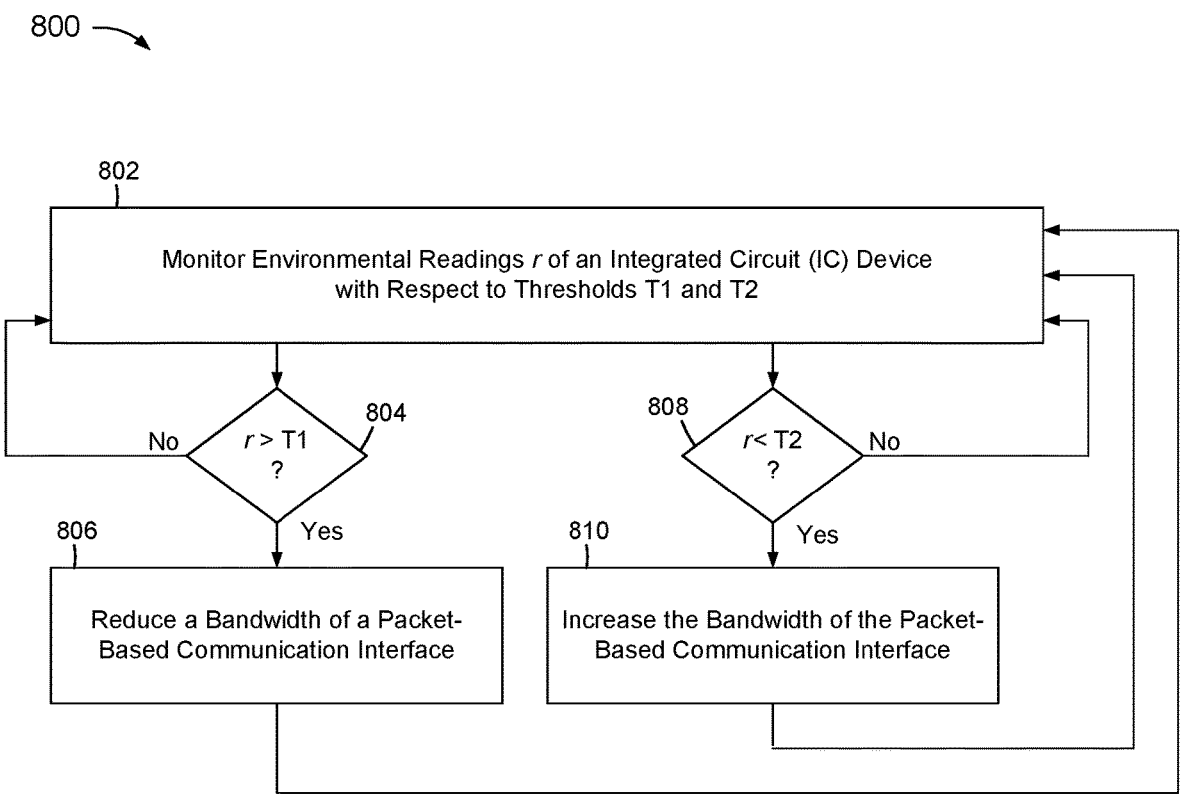
FIG. 8 is a flowchart of a method of managing an environmental condition of an IC device, according to an embodiment.

FIG. 8 is a flowchart of a method 800 of managing an environmental condition of an IC device, according to an embodiment. Method 800 is described below with reference to system 100. Method 800 is not, however, limited to system 100.

At 802, regulator 108 monitors an environmental condition of a system 100. Regulator 108 may monitor environmental readings 110 with respect to threshold 112. Environmental readings 110 may include temperature and/or power consumption readings, and threshold 112 may include an upper and lower threshold for each type of environmental readings 110. Regulator 108 may monitor the environmental condition with PI control loop 404 in FIG. 4.

At 804, when environmental readings 110 meet an upper threshold T1 (e.g., when control 406 in FIG. 4 is incremented), processing proceeds to 806.

At 806, regulator 108 reduces a bandwidth of communication interface 102 by inserting or increasing delay between packets of communication path 120 and/or communication path 118. Regulator 108 may, for example, insert delay in a handshake signal. Regulator 108 may reduce the bandwidth based on code 506 output from one of pattern registers 502A-502j. Regulator 108 may reduce the bandwidth based further on bandwidth control circuit 602 in FIG. 6.

At 808, when environmental readings 110 fall to a lower threshold T2 (e.g., when control 406 in FIG. 4 is decremented), regulator 108 increases the bandwidth of communication interface 102, such as by reducing the delay between packets of communication path 120 and/or communication path 118. Regulator 108 may, for example, reduce delay in the handshake signal.

Lower threshold T2 may be equal to or less than upper threshold T1.

In an embodiment, regulator 108 considers downstream and upstream bandwidth utilization measures 116A and 116B in determining whether to adjust a downstream bandwidth or and upstream bandwidth.

Method 800 may be performed or replicated for each of multiple types of environmental conditions (e.g., temperature and power consumption).

Method 800 may be useful to manage environmental conditions (e.g., temperature and/or power consumption) in a system that is subject to dynamic variations in workload characteristics, where an increased workload leads to increased power consumption and/or temperature. In an FPGA, for example, workload may be characterized by resource utilization and a logic activity factor. In an FPGA, a significant portion of power consumption may be variable based on dynamic workload characteristics.

Method 800 may also be useful to manage environmental conditions in static workload settings, such as where expansion card 704 is subject to temperature changes due to cooling or air flow design issues of a chassis of host 702.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof.

Information processing by software may be concretely realized by using hardware resources.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure, Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit device, comprising:
   packet-based communication interface circuitry configured to interface between a first device and a second device; and
   regulator circuitry configured to adjust a delay of a handshake signal communicated between the first device and the second device based on an environmental condition of the integrated circuit device to control a bandwidth of the packet-based communication interface circuitry.

2. The integrated circuit device of claim 1, wherein adjusting the delay of the handshake signal controls the bandwidth of the packet-based communication interface circuitry by controlling a delay between packets handled by the packet-based communication interface circuitry.

3. The integrated circuit device of claim 1, wherein the regulator circuitry is further configured to decrease the bandwidth based on the environmental condition and a first threshold and increase the bandwidth based on the environmental condition and a second threshold.

4. The integrated circuit device of claim 1, wherein the regulator circuitry comprises:
   controller circuitry configured to compare the environmental condition to a threshold;
   address counter circuitry configured to increment or decrement an address based on an output of the controller circuitry; and
   bandwidth control circuitry configured to retrieve a code from one of multiple registers based on the address of the address counter circuitry and to control a delay between packets handled by the packet-based communication interface circuitry based on the code.

5. The integrated circuit device of claim 1, wherein the regulator circuitry is further configured to control the bandwidth by:
   controlling an upstream bandwidth of the packet-based communication interface circuitry based on the environmental condition of the integrated circuit device and an upstream bandwidth utilization measure; and
   controlling a downstream bandwidth of the packet-based communication interface circuitry based on the environmental condition of the integrated circuit device and a downstream bandwidth utilization measure.

6. The integrated circuit device of claim 1, wherein the environmental condition is selected from the group comprising temperature and power consumption.

7. An apparatus, comprising:
   non-volatile memory circuitry;
   a sensor to sense an environmental condition;
   packet-based communication interface circuitry configured to interface between the non-volatile memory circuitry and an external device; and
   regulator circuitry configured to adjust a delay of a handshake signal communicated between the non-volatile memory circuitry and the external device based on the sensed environmental condition to control a bandwidth of the packet-based communication interface circuitry.

8. The apparatus of claim 7, wherein adjusting the delay of the handshake signal controls the bandwidth by controlling a delay between packets handled by the packet-based communication interface circuitry.

9. The apparatus of claim 7, wherein the regulator circuitry is further configured to decrease the bandwidth based on the sensed environmental condition and a first threshold and to increase the bandwidth based on the sensed environmental condition and a second threshold.

10. The apparatus of claim 7, wherein the regulator circuitry comprises:
    controller circuitry configured to compare the sensed environmental condition to a threshold;
    address counter circuitry to increment or decrement an address based on an output of the controller circuitry; and
    bandwidth control circuitry configured control the bandwidth by retrieving a code from one of multiple registers based on the address of the address counter circuitry and controlling a delay between packets handled by the packet-based communication interface circuitry based on the code.

11. The apparatus of claim 7, wherein the regulator circuitry is further configured to control the bandwidth by:
    controlling an upstream bandwidth of the packet-based communication interface circuitry based on the sensed environmental condition and an upstream bandwidth utilization measure; and
    controlling a downstream bandwidth of the packet-based communication interface circuitry based on the sensed environmental condition and a downstream bandwidth utilization measure.

12. The apparatus of claim 7, wherein the sensed environmental condition is selected from the group comprising temperature and power consumption.

13. A method, comprising:
exchanging packets between an integrated circuit (IC) device and a first device over a communication path under control of packet-based communication circuitry of the IC device;
sensing an environmental condition of the IC device; and
adjusting a delay of a handshake signal communicated between the IC device and the first device based on the sensed environmental condition to control a bandwidth of the communication path.

14. The method of claim 13, wherein adjusted the delay of the handshake signal controls:
a delay between the packets based on the sensed environmental condition.

15. The method of claim 13, wherein controlling comprises:
decreasing the bandwidth based on the sensed environmental condition and a first threshold; and
increasing the bandwidth based on the sensed environmental condition and a second threshold.

16. The method of claim 13, wherein controlling comprises:
incrementing an address based on the sensed environmental condition and a first threshold;
decrementing the address based on the sensed environmental condition and a second threshold;
retrieving a code from one of multiple registers based on the address; and
controlling a delay between the packets based on the code.

17. The method of claim 13, wherein controlling comprises:
controlling an upstream bandwidth of the communication path based on the sensed environmental condition and an upstream bandwidth utilization measure; and
controlling a downstream bandwidth of the communication path based on the sensed environmental condition and a downstream bandwidth utilization measure.

* * * * *